(12) United States Patent
Rajadhyaksha et al.

(10) Patent No.: US 8,182,682 B1
(45) Date of Patent: May 22, 2012

(54) FLUID TREATMENT ELEMENTS AND ASSEMBLIES

(75) Inventors: Vijay Y. Rajadhyaksha, Safety Harbor, FL (US); Leonard Bensch, New Port Richey, FL (US)

(73) Assignee: Pall Corporation, Port Washington, NY (US)

( * ) Notice: Subject to any disclaimer, the term of this patent is extended or adjusted under 35 U.S.C. 154(b) by 0 days.

(21) Appl. No.: 13/034,820

(22) Filed: Feb. 25, 2011

(51) Int. Cl.
*B01D 35/14* (2006.01)

(52) U.S. Cl. ............... 210/243; 210/440; 210/493.2; 361/215

(58) Field of Classification Search .............. 210/243, 210/440, 493.2; 361/215
See application file for complete search history.

(56) References Cited

U.S. PATENT DOCUMENTS

| | | | |
|---|---|---|---|
| 3,933,643 A * | 1/1976 | Colvin et al. | 210/243 |
| 4,187,179 A | 2/1980 | Harms | |
| 4,999,108 A * | 3/1991 | Koch et al. | 210/243 |
| 5,252,207 A | 10/1993 | Miller et al. | |
| 5,543,047 A | 8/1996 | Stoyell et al. | |
| 5,642,718 A | 7/1997 | Nakai et al. | |
| 6,099,726 A | 8/2000 | Gembolis et al. | |
| 6,332,987 B1 | 12/2001 | Whitney et al. | |
| 6,740,236 B2 | 5/2004 | Rickle et al. | |
| 7,128,835 B1 | 10/2006 | Hundley et al. | |
| 2010/0025318 A1* | 2/2010 | Berland et al. | 210/243 |

* cited by examiner

*Primary Examiner* — Matthew Savage
(74) *Attorney, Agent, or Firm* — Leydig, Voit & Mayer, Ltd.

(57) ABSTRACT

Fluid treatment elements and assemblies include a spring-biased electrical contact arrangement to dissipate electrical charge from the fluid treatment pack and/or the end caps to the housing.

20 Claims, 3 Drawing Sheets

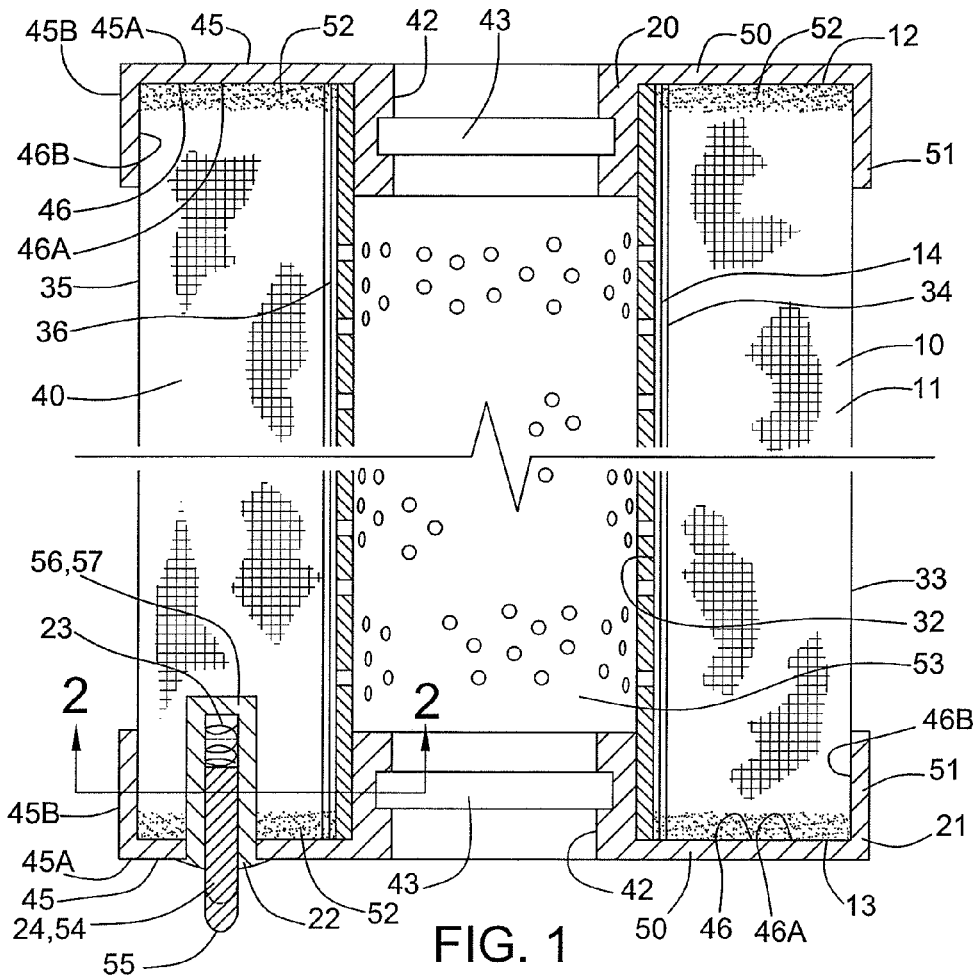
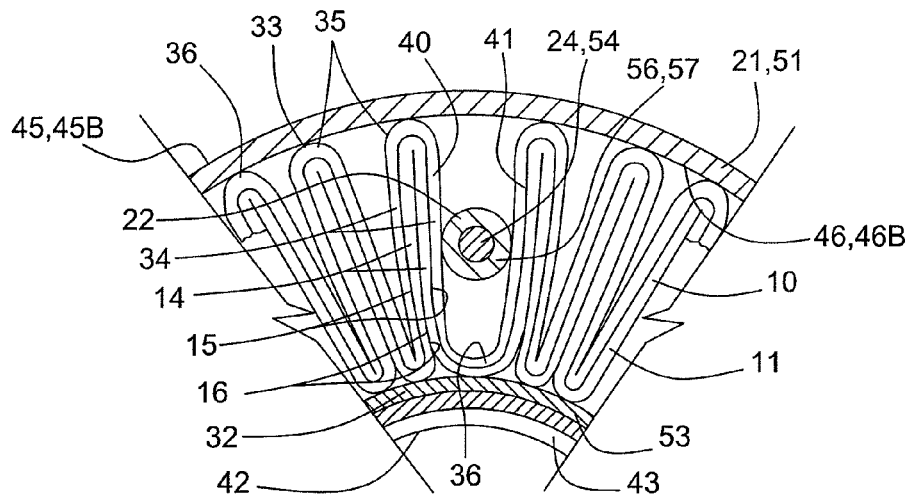

FLUID TREATMENT ELEMENTS AND ASSEMBLIES

FIELD OF THE INVENTION

The present invention relates to a wide variety of fluid treatment elements and assemblies that may be used to treat any of numerous different fluids including, for example, a gas, a liquid, or a mixture of gases, liquids, and/or solids. For example, the fluid treatment elements may include filters that may be used to separate one or more substances, e.g., particulates and/or gels, from a fluid, including, for example, a gas, an aqueous liquid, or an oil-based liquid such as fuel. As another example, the fluid treatment elements may include coalescers that may be used to separate tiny droplets of one liquid that are carried in another fluid, e.g., a gas or a liquid. A fluid treatment element may be contained in a housing to form a fluid treatment assembly. The housing may include a fluid inlet and a fluid outlet and may define a fluid flow path within the housing. The fluid treatment element may be positioned in the fluid flow path in the housing.

A fluid treatment element embodying the invention may include a hollow fluid treatment pack having first and second axial ends. For some embodiments, the fluid treatment pack may be pleated; for other embodiments, the fluid treatment pack may not be pleated. However, either fluid treatment pack may include a porous fluid treatment medium, for example, a filter medium or a coalescer medium, which has an upstream side and a downstream side. First and second end caps may be mounted to the first and second axial ends of the fluid treatment pack. One or both of the end caps may have a central opening which allows fluid to flow out of or into the interior of the hollow fluid treatment pack, and the end caps serve to direct fluid flow through the porous fluid treatment medium from the upstream side to the downstream side. For many embodiments, fluid flow may be directed outside-in through the hollow fluid treatment pack, and the upstream side of the fluid treatment medium may be the outer side of the medium, while the downstream side may be the inner side of the medium. For other embodiments, fluid flow may be directed inside-out through the hollow fluid treatment pack, and the upstream side of the fluid treatment medium may be the inner side of the medium, while the downstream side may be the outer side of the medium.

As fluid flows through the fluid treatment pack, the fluid is treated by the fluid treatment medium. For example, the fluid treatment medium may be a filter medium which traps one or more substances on the upstream side of the medium and/or within the medium as the fluid flows through the fluid treatment pack. As another example, the fluid treatment medium may be a coalescer medium which agglomerates tiny droplets of one liquid that are carried in another fluid, e.g., a gas or a liquid, as the fluids flow through the fluid treatment pack, forming large droplets that may be easily separated from the carrier fluid.

SUMMARY OF INVENTION

In accordance with one aspect of the invention, a fluid treatment element can be mounted in a housing and may comprise a hollow fluid treatment pack, first and second end caps, and a spring-biased electrical contact arrangement. The fluid treatment pack may have first and second axial ends and may include a porous fluid treatment medium having an upstream side and a downstream side. The first and second end caps may be mounted to the first and second ends, respectively, of the fluid treatment pack to direct fluid through the porous fluid treatment medium from the upstream side to the downstream side. At least one of the first and second end caps has an outer surface which faces away from the fluid treatment pack and an inner surface which faces toward the fluid treatment pack. The spring-biased electrical contact arrangement may be mounted to at a least one end cap and may include a spring and a moveable conductive pin. The conductive pin has a contact surface and is electrically coupled to at least one of the fluid treatment pack and said end cap. Further, the conductive pin is moveable between a first a position and a second position. In the first position, the contact surface is farther from the outer surface of said end cap, and in the second position the contact surface is closer to the outer surface of said end cap. The spring is arranged to bias the conductive pin toward the first position to force the contact surface into electrical contact with a conductive portion of the housing. The spring-biased electrical contact arrangement may further include a casing which houses the spring and at least a portion of the moveable conductive pin.

In accordance with another aspect of the invention, a fluid treatment element may comprise a hollow fluid treatment pack, first and second end caps, and a spring-biased electrical contact arrangement. The fluid treatment pack may include an inner periphery, an outer periphery, first and second axial ends, and a plurality of axially extending pleats. Each pleat may have a folded end and first and second pleat legs extending from the folded end between the inner and outer peripheries. Further, the pleated fluid treatment pack may comprise a pleated multilayer composite which includes a layer of porous fluid treatment medium and a conductive porous metal layer. The porous fluid treatment medium may have an upstream side and a downstream side, and the conductive porous metal layer may be positioned on the upstream side or the downstream side of the porous fluid treatment medium. The first and second end caps are mounted to the first and second ends, respectively, of the fluid treatment pack to direct fluid through the porous fluid treatment medium from the upstream side to the downstream side. At least one of the first and second end caps has an outer surface which faces away from the fluid treatment pack. The spring-biased electrical contact arrangement may be mounted to said at least one end cap and may include an electrical conductor, a spring, and a moveable electrical contact. The electrical conductor may extend within a pleat of the fluid treatment pack along at least one of the first and second pleat legs and may be electrically coupled to the porous metal layer. The moveable electrical contact may be electrically coupled to the electrical conductor. Further, the moveable electrical contact may extend beyond the outer surface of said end cap and may be moveable toward and away from the outer surface of said end cap. The spring biases the electrical contact away from the outer surface of said end cap.

Fluid treatment elements and assemblies embodying the invention have many advantages. For example, in addition to treating the fluid, the fluid treatment medium and other components of the fluid treatment pack may strip electrons from fluid flowing through the fluid treatment pack. The spring-biased electrical contact arrangement provides an effective, reliable electrical pathway from the fluid treatment pack and/or the end caps to the housing, which may be grounded. Consequently, fluid treatment elements and assemblies embodying the invention safely dissipate any electrical charge and prevent a static discharge of electricity, for example, in the form of a spark or arc that might harm or degrade the fluid, the fluid treatment element, and/or the housing of the fluid treatment assembly.

BRIEF DESCRIPTION OF THE DRAWINGS

FIG. 1 is a cross sectional view of a fluid treatment element.

FIG. 2 is a cross sectional view of a portion of the fluid treatment element of FIG. 1 as viewed along line 2-2.

DESCRIPTION OF EMBODIMENTS OF THE INVENTION

Figure 3:
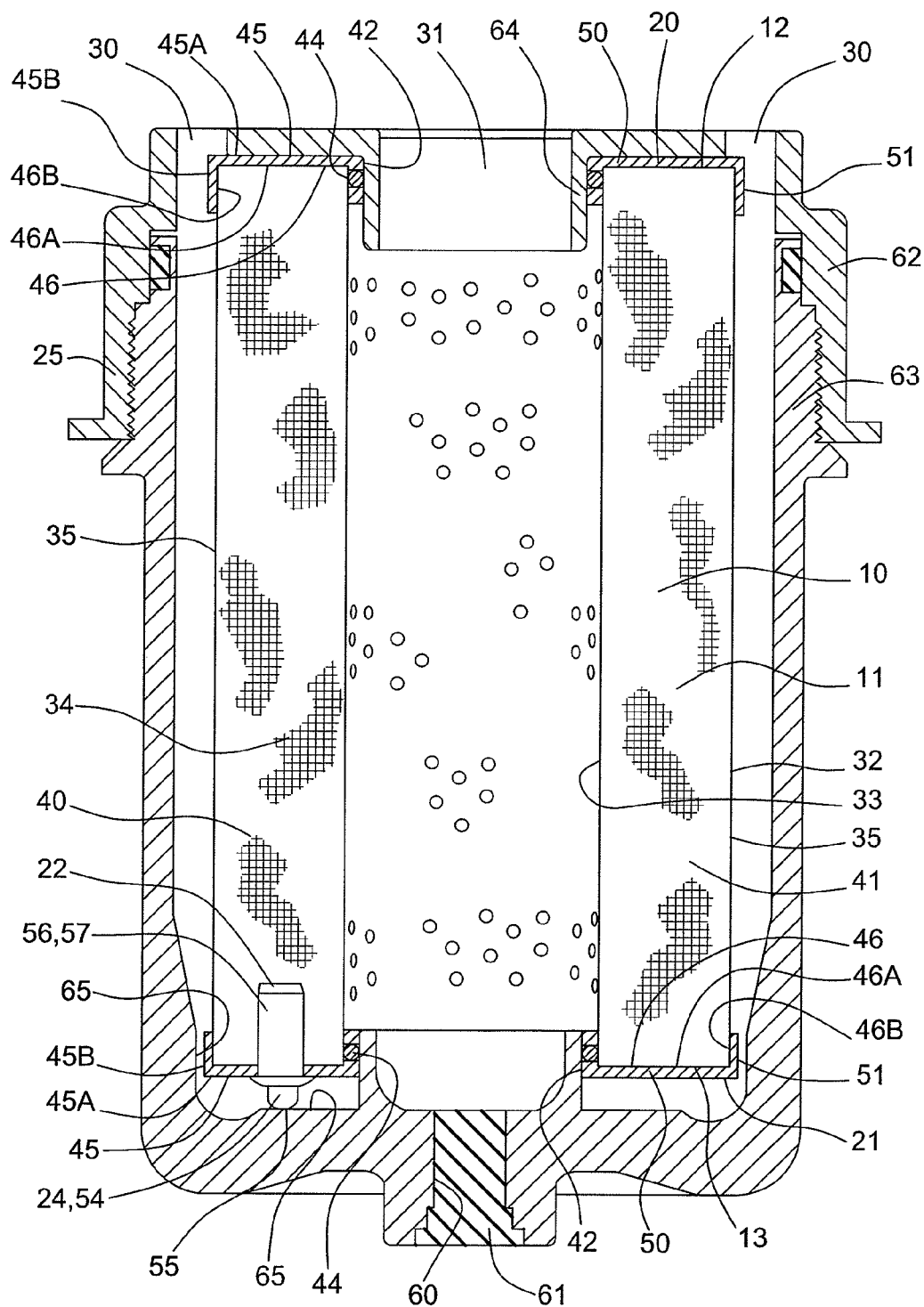
FIG. 3 is a cross-sectional view of a fluid treatment assembly including the fluid treatment element of FIG. 1

Fluid treatment elements embodying the invention may be configured in a wide variety of ways. One of many different examples of a fluid treatment element 10 is shown in FIGS. 1-3. The fluid treatment element 10 may comprise a hollow fluid treatment pack 11 which has first and second axial ends 12, 13 and a porous fluid treatment medium 14 which has an upstream side 15 and a downstream side 16. The fluid treatment element 10 may further comprise first and second end caps 20, 21 and at least one spring-biased electrical contact arrangement 22. The first and second end caps 20, 21 may be mounted to the first and second axial ends 12, 13, respectively, of the fluid treatment pack 11 to direct fluid through the fluid treatment medium 14 from the upstream side 15 to the downstream side 16. The spring-biased electrical contact arrangement 22 may be mounted to at least one of the first and second end caps 20, 21 and may include a spring 23 and a moveable electrical contact 24. The moveable electrical contact 24 is electrically coupled to the fluid treatment pack 11 and/or the end cap 21 to which the spring-biased electrical contact arrangement 22 is mounted. The spring 23 biases the moveable electrical contact away from the end cap 21.

The fluid treatment element 10 may be mounted in a housing 25 to form a fluid treatment assembly 26. The housing 25 may have a fluid inlet 30 and a fluid outlet 31 and may define a fluid flow path within the housing 25 between the fluid inlet 30 and the fluid outlet 31. The fluid treatment element 10 may be positioned in the housing 25 in the fluid flow path with the moveable electrical contact 24 of the spring-biased electrical contact arrangement 22 electrically contacting a conductive portion of the housing 25. Fluid may enter the fluid inlet 30, pass through the fluid treatment pack 11, and exit the housing 25 via the fluid outlet 31. As the fluid passes through the fluid treatment pack 11, it is directed by the end caps 20, 21 through porous fluid treatment medium 24 where the fluid may be treated in any of numerous ways in accordance with the fluid treatment characteristics of the fluid treatment medium 14. In addition, the fluid treatment medium 14 and/or other components of the fluid treatment pack 11 may strip electrons from the fluid flowing through the fluid treatment pack 11. The resulting electrical charge is safely and effectively dissipated from the fluid treatment pack 11 and/or from the end cap 21 via the spring-biased electrical contact arrangement 22 to the housing 25, where, for example, the electrical charge may be sent to ground.

The components of the fluid treatment assembly including the fluid treatment element may be fashioned in any of numerous ways. For example, the hollow fluid treatment pack may be variously configured. In the illustrated embodiment, the fluid treatment pack 11 may have a generally cylindrical configuration and an inner periphery 32 and an outer periphery 33. The fluid treatment pack may consist of only the fluid treatment medium, or it may comprise a multilayer composite having one or more layers of a fluid treatment medium 14 and one or more additional components. For example, the fluid treatment pack 11 may include a porous layer 34 on the upstream side 15 and/or downstream side 16 of the fluid treatment medium 14 which may be coarser than the fluid treatment layer 14. The porous layer 34 may serve as a drainage layer to drain fluid to or from the fluid treatment layer 14. Alternatively or additionally the porous layer 34 may serve as a support layer to structurally support the fluid treatment medium 14. For many embodiments, the porous layer may be electrically conductive to conduct any accumulated electrical charge away from the fluid treatment medium 14. For example, the conductive porous layer may be formed as a porous metal layer such as a metal mesh layer. Embodiments of the invention may include porous layers, e.g., conductive porous layers, on both the upstream and downstream sides of the fluid treatment medium. A porous layer may contact the upstream or downstream side of the fluid treatment medium or an additional layer, including a cushioning layer, may be positioned between the porous layer and the fluid treatment medium.

Further, the hollow fluid treatment pack may or may not be pleated. A pleated fluid treatment pack may include a plurality of axially extending pleats 35. Each pleat may include a folded end 36, which may be on the inner periphery 32 or the outer periphery 33, and first and second pleat legs 40, 41, which extend from the folded end 36 between the inner and outer peripheries 32, 33. The height of each pleat may be generally equal to or greater than the radial distance between the inner and outer peripheries 32, 33 of the fluid treatment pack 11. Each pleat may consist of only the fluid treatment medium or may comprise a multilayer composite including the fluid treatment medium 14 and one or more additional components as previously described. For many embodiments, a conductive porous layer 34, e.g., a porous metal layer, may be an outermost layer and/or an innermost layer of each pleat 35, including each pleat leg 40, 41. Many filter elements embodying the invention may have a pleated fluid treatment pack. A non-pleated fluid treatment pack may comprise a single hollow cylindrical fluid treatment medium or multiple hollow cylindrical layers radially nested within one another. One or more of the cylindrical layers may comprise the fluid treatment medium, while another of the cylindrical layers may comprise an electrically conductive layer such as a porous or perforated metal layer, e.g., a metal mesh layer. Many coalescer elements embodying the invention may have a non-pleated fluid treatment pack.

The fluid treatment medium 14 may be fashioned as any of a variety of structures, including, for example, as a supported or nonsupported membrane or as a fibrous structure, such as a hollow cylindrical fibrous mass or a woven or nonwoven fibrous sheet. The fluid treatment medium 14 may be formed from any of numerous conductive or nonconductive materials, including, for example, natural or synthetic polymers, a glass or other ceramic, or a metal, and may have any of numerous fluid treatment characteristics. For many embodiments, the fluid treatment medium may comprise a filter medium, including, for example, a nonconductive sheet of glass fibers supported by a porous polymeric substrate. For other embodiments, the fluid treatment medium may comprise a coalescer medium, including, for example, a hollow cylindrical nonconductive mass of glass fibers. Further, the fluid treatment medium may have a graded pore structure and/or any of a wide range of removal ratings. For example, the fluid treatment medium may have a removal rating in the submicron range, the micron range, or coarser.

The end caps may also be fashioned in any of numerous ways. For example, both of the end caps 20, 21 may be open end caps having a central opening 42 which fluidly communicates with the hollow interior of the fluid treatment medium 14. Each end cap 20, 21 may have a groove 43 that may contain an O-ring 44 for sealing the fluid treatment element 10 to the housing 25. The opening 42 in one of the end caps, e.g., the end cap 20 without the spring-biased electrical contact arrangement 22, may fluidly communicate with one of the fluid inlet 30 and the fluid outlet 31, e.g., the fluid outlet 31, of the housing 25. The opening 42 in the other end cap 21 may be closed off by the housing 25. Alternatively, one of the end caps, e.g., the end cap that fluidly communicates with the fluid inlet or outlet, may be an open end cap, while the other end cap may be a blind end cap which blocks off fluid flow through that end of the fluid treatment pack.

One or both of the end caps 20, 21 may also have an outer surface 45 which faces away from the fluid treatment pack 11 and an inner surface 46 which faces toward the fluid treatment pack 11. For example, the end cap 20, 21 may comprise a radially extending disk portion 50 and an axially extending skirt 51 which depends from the disk portion 50 toward the opposite end cap 20, 21. The outer surface 45 of each end cap 20, 21 may then include the axially facing outer surface 45A of the disk portion 50 and the radially facing outer surface 45B of the skirt 51, while the inner surface 46 may include the axially facing inner surface 46A of the disk portion 50 and the radially facing inner surface 46B of the skirt 51.

One or both of the end caps may be made from a conductive or nonconductive material, including a conductive or nonconductive polymeric material or a metal. For many embodiments, the end cap 20, 21 may be made from a conductive polymeric material or a metal. Further, the first and second end caps 20, 21 may be joined to the first and second ends 12, 13, respectively, of the fluid treatment pack 11 in a variety of ways. For example, each end cap 20, 21 may be bonded to an end 12, 13 of the fluid treatment pack 11, including the fluid treatment medium 14 and/or the porous layer 34, by a potting compound 52 such as an epoxy or a polyurethane. Alternatively, a polymeric end cap 20, 21 may be melt bonded to the end 12, 13 of the fluid treatment pack. For many embodiments, one or both end caps 20, 21 may be joined to the end(s) 12, 13 of the fluid treatment pack 11 in a manner which electrically connects the fluid treatment pack 11 to the end cap(s) 20, 21. For example, an electrically conductive potting compound 52 may bond and electrically connect a conductive portion of the fluid treatment pack 11, e.g., a conductive fluid treatment medium 14 or a porous metal mesh layer 34, to a conductive end cap 20, 21, e.g., a metal end cap. As another example, a conductive or nonconductive potting compound 52 may bond a conductive portion of the fluid treatment pack 11, e.g., a conductive fluid treatment medium 14 or a porous metal mesh layer 34, in electrical contact with a conductive end cap 20, 21, e.g., a metal end cap. For other embodiments, one or both end caps 20, 21 may be joined to the end(s) 12,13 of the fluid treatment pack 11 in a manner which does not electrically connect the fluid treatment pack 11 to the end cap(s) 20, 21. For example, a nonconductive polymeric end cap 20, 21 may be joined to an end of fluid treatment pack 11 having a conductive portion, e.g., a conductive fluid treatment medium 14 or a porous metal mesh layer 34.

The fluid treatment element 10 may include additional components. For example, a perforated core 53 may extend along the interior of the hollow fluid treatment pack 11 to support the pack 11 against forces associated with the fluid flowing through the pack 11. In the illustrated embodiment, the perforated core 53 may be joined to the end caps 20, 21 along with the fluid treatment pack 11. In other embodiment, the perforated core may be part of the housing, and the fluid treatment element may be fitted around the perforated core when the fluid treatment element is mounted to the housing. In still other embodiments, neither the fluid treatment element nor the housing may include a perforated core. The fluid treatment element may also include a retainer (not shown), including, for example, a cage or a wrap, which extends around a pleated fluid treatment pack to hold the pleats in place and/or to protect the fluid treatment pack during storage, shipping, or installation.

Many of the previously described features of the fluid treatment element 10 may be further disclosed in U.S. Pat. No. 5,252,207; U.S. Pat. No. 5,543,047; U.S. Pat. No. 6,332,987; and/or U.S. Pat. No. 7,128,835. All of these patents are incorporated by reference herein to support these features.

The spring-biased electrical contact arrangement may also be configured in a great variety of ways. For example, the moveable electrical contact 24 may comprise a moveable conductive pin 54 having a contact surface 55 and a shaft. The contact surface 55 may be variously configured. For example, the contact surface may be flat or rounded, e.g., generally spherical or generally conical with a rounded tip. The conductive pin may be formed from a conductive material, e.g., a metal. Further, the moveable conductive pin may be disposed entirely on the outer surface of the end cap to which the spring-biased electrical contact arrangement is mounted. However, in the illustrated embodiment, the moveable conductive pin 54 extends through the end cap 21 between the outer surface 45 and the inner surface 46. The electrical contact 24 is moveable toward and away from the outer surface 45 of the end cap 20. For example, the moveable conductive pin 54 may move between a first position, where the contact surface 55 is farther from the outer surface 45 of the end cap 21, and a second position, where the contact surface 55 is closer to the outer surface 45, as shown by the dashed lines in FIG. 1. In particular, the conductive pin 54 may move axially between the first and second positions as shown by the solid and dashed lines in FIG. 1 toward and away from the outer surface 45A of the disk portion 50 of the end cap 21. The spring 23 may be operatively associated with, e.g., connected to, the moveable electrical contact 24 to bias the moveable electrical contact 24 away from the outer surface 45 of the end cap 21, e.g., to bias the conductive pin 54 toward the first position. The spring 23 may be fashioned in a variety of ways and may be formed from any of numerous materials. For example, the spring 23 may be a coil or leaf spring made from spring metal.

The spring-biased electrical contact arrangement 22 may also include a casing 56 which houses or contains the spring 23 and at least portion of the moveable electrical contact 24, e.g., the moveable conductive pin 54. The spring 23 may expand and contract within the casing 56 and the electrical contact 24 may move within the casing 56. The casing 56 may protect the spring 23 and the moveable conductive pin 54 from damage during shipping or installation and may prevent dirt and other agents from interfering with the biasing function of the spring 23 and the movement of the moveable conductive pin 54. The casing 56 may be joined to the end cap 21 in any of numerous ways, including, for example, by bonding or welding. For many embodiments, the casing 56 may be mechanically fitted, e.g., threaded or press fitted, to the end cap 21. The casing may be positioned entirely on the outer surface or the inner surface of the end cap with the moveable conductive pin extending partly from one end of the casing. For many embodiments, the casing 56 may extend through the end cap 21 between the outer and inner surfaces 45,46 with the moveable conductive pin 54 extending at least partly from the outer end of the casing 56. The casing may also comprise a thick portion of the end cap that is provided with a bore in which the spring and the moveable electrical contact, e.g., the moveable conductive pin, may be disposed.

The spring-biased electrical contact arrangement 22 may further include an electrical conductor 57 which is electrically connected between the moveable electrical contact 24, e.g., the moveable conductive pin 54, and one or both of the end cap 21 and the fluid treatment pack 11. The electrical conductor may be variously configured. For example, the electrical conductor may comprise a wire or other electrical lead that is electrically connected between the moveable conductive pin and a conductive end cap and/or a conductive portion of the fluid treatment pack, e.g., a conductive fluid treatment medium or a conductive porous layer. For many embodiments, the electrical conductor 57 may comprise the casing 56 of the spring-biased electrical contact arrangement 22. The casing 56 may be formed from conductive material, e.g., a metal, and may be electrically coupled to the moveable conductive pin 54, as well as the spring 23, inside the casing 56. The conductive casing 56 may also be electrically connected to a conductive end cap 21 and/or a conductive portion of the fluid treatment pack 11, e.g., a conductive fluid treatment medium 14 or a conductive porous layer 34. For example, the conductive casing 56 may be mechanically connected to a metal end cap 21, electrically coupling the casing 56 and the end cap 21. Alternatively, the conductive casing 56 may be welded to the metal end cap 21 or bonded to the end cap 21 with a conductive bonding agent. Alternatively or additionally, the conductive casing 56 may be electrically connected to a conductive portion of the fluid treatment pack 11. For example, the conductive casing 56 may extend between the legs 40,41 of a pleat 35, mechanically and electrically contacting one or both of the legs 40,41 along the upstream or downstream side of the fluid treatment pack 11. In the illustrated embodiment, the outermost layer of the fluid treatment pack 11 may be a conductive porous layer 34, e.g., a porous metal layer, and the conductive casing 56 may electrically contact the conductive porous layer 34 along one or both pleat legs 40,41, as shown in FIG. 2. Alternatively or additionally, the conductive casing 56 may be electrically connected to a conductive portion of the fluid treatment pack 11 by a conductive potting compound 52. In nonpleated embodiments, the electrical conductor, e.g., the conductive casing, may extend into or between cylindrical layers of the fluid treatment pack, mechanically and electrically contacting a conductive portion of the pack.

The housing 25 may be configured in any of numerous ways. Generally, the housing 25 may include a fluid inlet 30 and a fluid outlet 31 and may define a fluid flow path within the housing 25 from the fluid inlet 30 to the fluid outlet 31. The housing may also include one or more additional ports, including a drain 60 plugged by a drain plug 61. The fluid treatment element 10 may be positioned in the housing 25 across the fluid flow path. The housing and the fluid treatment element may be arranged to direct fluid flow inside out through the fluid treatment element. The inner layers, sides, and surfaces of the various components may then be the upstream layers, sides, and surfaces while the outer layers, sides, and surfaces may be the downstream layers, sides, and surfaces. In the embodiment illustrated in FIG. 3, the housing 25 and the fluid treatment element 10 are arranged to direct fluid flow outside in through the fluid treatment element 10. The outer layers, sides, and surfaces of the various components may then be the upstream layers, sides, and surfaces while the inner layers, sides, and surfaces may be the downstream layers, sides, and surfaces.

The housing may be a single piece or a multipiece structure. For many embodiments, the housing 25 may have a header 62 including the fluid inlet 30 and the fluid outlet 31 and a bowl 63 that is removably mechanically attached to the header 62 in any of a wide variety of ways. For example, the bowl 63 may be threaded to the header 62. Alternatively, one or both of the fluid inlet and the fluid outlet may be part of the bowl instead of the header.

The fluid treatment element 10 may be mounted in the housing 25 in any manner which forces the moveable electrical contact 24 against a conductive portion of the housing 25. For example, the bowl 63 may be unthreaded and removed from the header 62. The fluid treatment element 10 may then be mounted to the header 62, for example, by installing the end cap 20 without the spring-biased electrical contact arrangement 22 around a depending sleeve 64 of the header 62, the Oring 44 in the end cap 20 sealing against the sleeve 64. The bowl 63 may then be threaded back onto the header 62. As the bowl 63 approaches the spring-biased electrical contact arrangement 22, the electrical contact 24, e.g., the contact surface 55 of the conductive pin 54, contacts and the moves along a conductive portion 65, for example, a metal portion, of the bottom wall of the bowl 63. Initially, the moveable conductive pin 54 may contact the bowl 63 with the pin 54 in its first position. As the bowl 63 is further tightened onto the header 62, the moveable conductive pin 54 moves axially toward its second position, moving axially toward the outer surface 45A of the end cap 21 and into the casing 56 and compressing the spring 23. Once the bowl 63 is fully tightened onto the header 62, the electrical contact 24 is firmly pressed against the conductive portion of the housing 25 by the compressed spring 23. For example, the contact surface 55 of the moveable conductive pin 54 is firmly forced against the conductive portion 65 of the bowl 63 by the compressed spring 53.

The spring constant of the spring 53 may be low enough to prevent the electrical contact 24, e.g., the contact surface 55, from scratching the conductive portion 65 of housing 25. Scratching the housing 25 may lead to corrosion or other damage. A rounded contact surface 55 may facilitate mounting the fluid treatment element 10 within the housing 25 without scratching the housing 25. A lower spring constant also allows the bowl 63 to be properly torqued to the header 62 without exceeding the torque specification. However, the spring constant of the spring 23 may also be high enough to firmly seat the moveable electrical contact 24, e.g., the contact surface 55 of the moveable conductive pin 54, against the conductive portion 65 of the housing 25 and establish a reliable electrical connection between the housing 25 and the spring-biased electrical contact arrangement 22. Further, the spring constant of the spring 23 may be high enough to force the electrical contact 24 against the housing 25 and rub off any coating, for example, an anodized coating, in the interior of the housing 25, ensuring that a reliable electrical contact is established with the conductive portion 65 of the housing 25. Consequently, the spring constant, as well as the degree of roundedness of the rounded contact surface, may be empirically determined for any fluid treatment assembly based on factors such as the nature of any coating in the housing and the nature of the conductive portion of the housing.

With the fluid treatment element 10 fully mounted inside the housing 25, fluid may be directed into the fluid inlet 30, through the fluid treatment pack 11, and out through the fluid outlet 31. As the fluid flows through the fluid treatment medium 14, the fluid may be treated in accordance with the fluid treatment characteristics of the medium 14. Further, electrons may be stripped from the fluid by the fluid treatment medium 14 and/or other components of the fluid treatment pack 11, potentially accumulating electrical charge. Nonconductive fluids, including fuels such as jet fuel or kerosene, passing through nonconductive fluid treatment media, including glass fiber media, are particularly susceptible to losing electrons to the fluid treatment pack. However, the spring-biased electrical contact arrangement 22 effectively and safely dissipates any accumulating charge in the fluid treatment pack and/or the end cap, providing a reliable electrical pathway from the fluid treatment pack and/or the end caps directly to the housing without any risk of harmful static discharges or arcing.

While various aspects of the invention have been described and/or illustrated with respect to several embodiments, the invention is not limited to those embodiments. For instance, one or more features of these embodiments may be eliminated or modified or one or more features of one embodiment may be combined with one or more features of other embodiments without departing from the scope of the invention. Even embodiments with very different features may be within the scope of the invention.

For example, the embodiments of FIGS. 1-3 may be modified to provide more than one spring-biased electrical contact arrangement on the end cap. A plurality of spring-biased electrical contact arrangements, e.g., equally angularly spaced around the end cap, may even further enhance the dissipation of electrical charge to the housing. Further, one or more spring-biased electrical contact arrangements may be mounted to the upper end cap 20 instead of or in addition to the spring-biased electrical contact arrangement(s) on the lower end cap 21. The spring-biased electrical contact arrangements may then electrically contact the header of the housing.

Figure 4:
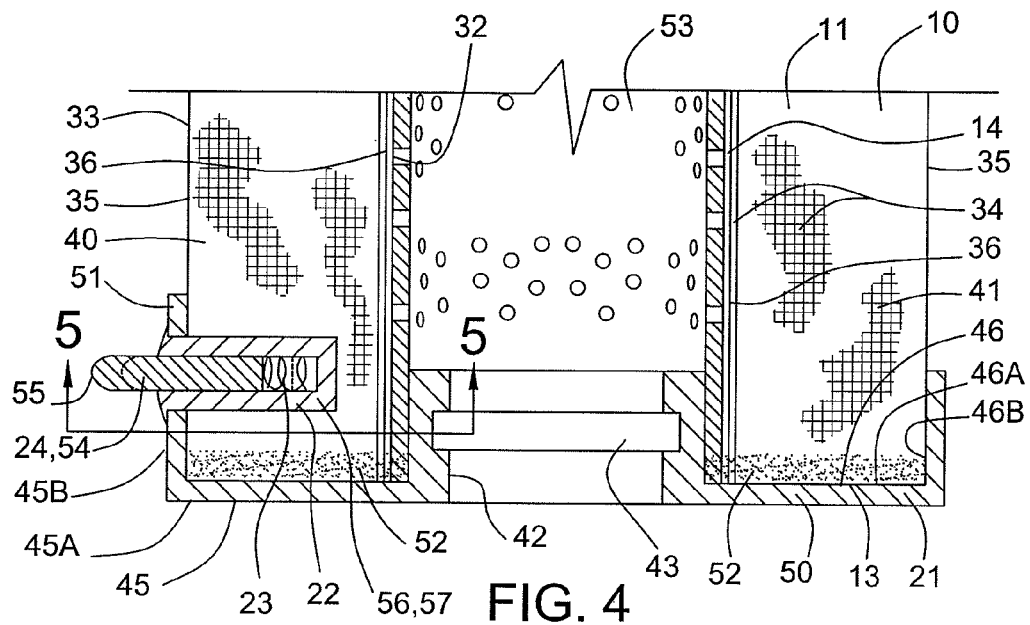
FIG. 4 is a cross sectional view of another fluid treatment element.
Figure 5:
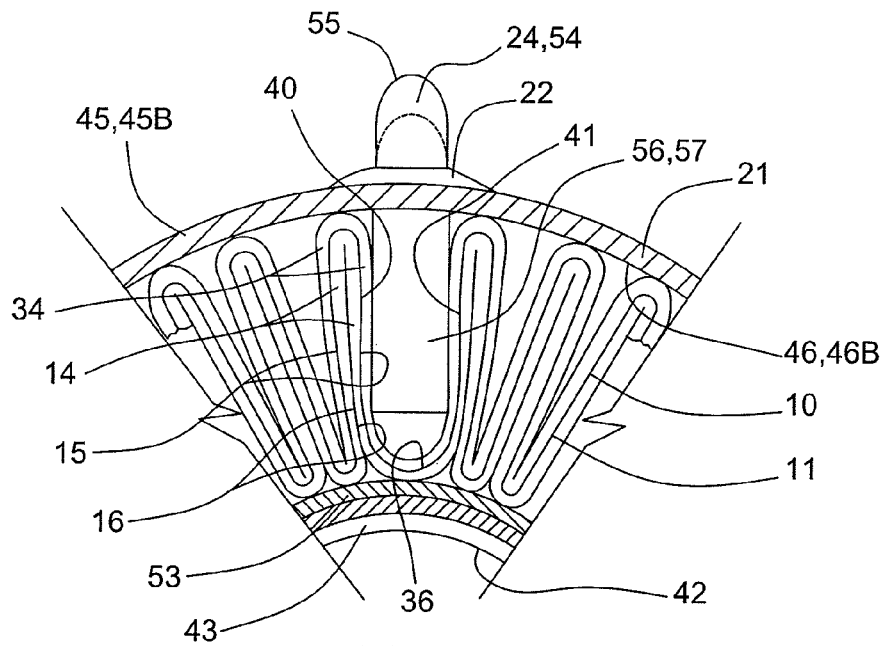
FIG. 5 is a cross sectional view of a portion of the fluid treatment element of FIG. 4 as viewed along line 5-5.

As another example, the fluid treatment element 10 may have a spring-biased electrical contact arrangement 22 mounted to the skirt 51 of either or both end caps 20,21, as shown in FIGS. 4 and 5, instead of or in addition to a spring-biased electrical contact arrangement 22 mounted to the disk portion 50 of the end cap 21, as shown in FIGS. 1-3. Many of the components of the fluid treatment element 10 shown in FIGS. 4 and 5 may be similar to those shown in FIGS. 1-3 and similar components are labeled with the same reference numerals. The spring-biased electrical contact arrangement 22 shown in FIGS. 4 and 5 extends radially through the skirt 51 between the outer and inner surface 45B,46B and into the fluid treatment pack 11. For example, an electrical conductor 57 in the form of a conductive casing 56 extends radially between the pleat legs 40,41 of a pleat 35, mechanically and electrically contacting the fluid treatment pack, e.g., a conductive porous layer 34, and/or the end cap 21. The moveable electrical contact 24, e.g., the moveable conductive pin 54, is electrically coupled to the electrical conductor 57, e.g., the casing 56, and moves radially toward and away from the outer surface 45B of the skirt 51 of the end cap 21 and between first and second positions. In the first position, the contact surface 55 is radially farther from the outer surface 45B of the skirt 51 of the end cap 21. In the second position, the contact surface 55 is radially closer to the outer surface 45B of the skirt 51 of the end cap 21. The spring 23 biases the conductive pin 54 radially toward the first position.

The fluid treatment element 10 of FIGS. 4 and 5 may be mounted to the housing 25 of FIG. 3 in a manner similar to the fluid treatment element 10 of FIGS. 1 and 2. For example, after the fluid treatment element 10 is mounted to the header 62, the bowl 63 may be positioned around the fluid treatment element 10 and threaded to the header 62. The moveable electrical contact 24, e.g., the contact surface 55 of the moveable conductive pin 54, may then contact and move along a conductive portion of the housing 25, e.g., the conductive side wall of bowl 63. As the bowl 63 is fully tightened to the header 62, the moveable conductive pin 54 may move radially inwardly from the first position toward the outer surface 45A of the skirt 51 and into the casing 56. The spring 53 biases the moveable electrical contact 24 against the housing 25, e.g., biases the contact surface 55 of the moveable pin 54 against the conductive side wall of the bowl 63, to effectively and reliably electrically connect the fluid treatment element 10 to the housing 25.

The present invention is thus not restricted to the particular embodiments which have been described and/or illustrated herein but includes all embodiments and modifications that may fall within the scope of the invention as defined by the claims.

The invention claimed is:

1. A fluid treatment element mountable in a housing, the fluid treatment element comprising:
a hollow fluid treatment pack having first and second axial ends and including a porous fluid treatment medium having an upstream side and a downstream side;
first and second end caps mounted to the first and second ends, respectively, of the fluid treatment pack to direct fluid through the porous fluid treatment medium from the upstream side to the downstream side, at least one of the first and second end caps having a outer surface which faces away from the fluid treatment pack and an inner surface which faces toward the fluid treatment pack; and
a spring-biased electrical contact arrangement mounted to said at least one end cap, wherein the spring biased electrical contact arrangement includes a spring and a moveable conductive pin electrically coupled to at least one of the fluid treatment pack and said end cap, wherein the moveable conductive pin has a contact surface and is moveable between a first position wherein the contact surface is farther from the outer surface of said end cap and a second position wherein the contact surface is closer to the outer surface of said end cap, and wherein the spring is arranged to bias the conductive pin toward the first position to force the contact surface into electrical contact with a conductive portion of a housing, wherein the spring-biased electrical contact arrangement further includes a casing which houses the spring and at least a portion of the moveable conductive pin.

2. The fluid treatment element of claim 1 wherein said at least one end cap is formed from metal.

3. The fluid treatment element of claim 1 wherein the porous fluid treatment medium comprises a glass fiber medium.

4. The fluid treatment element of claim 1 wherein the fluid treatment pack including the fluid treatment medium is pleated.

5. The fluid treatment element of claim 1 wherein the spring-biased electrical contact arrangement further includes an electrical conductor electrically connected to at least one of the fluid treatment pack and said end cap, the moveable conductive pin being electrically coupled to the electrical conductor.

6. The fluid treatment element of claim 1 wherein the outer surface of said end cap faces axially and the moveable pin moves axially between the first and second positions.

7. The fluid treatment element of claim 1 wherein the outer surface of said end cap faces radially and the moveable pin moves radially between the first and second positions.

8. The fluid treatment element of claim 1 wherein the conductive pin extends through said end cap between the outer and inner surfaces.

9. The fluid treatment element of claim 1 wherein the moveable conductive pin has a rounded contact surface.

10. The fluid treatment element of claim 1 wherein the fluid treatment medium comprises a filter medium.

11. A fluid treatment assembly comprising a housing and a fluid treatment element of claim 1, wherein the housing has a fluid inlet and a fluid outlet and defines a fluid flow path within the housing between the inlet and the outlet and wherein the fluid treatment element is positioned within the housing across the fluid flow path, the spring biasing the contact surface of the moveable pin against a conductive portion of the housing.

12. The fluid treatment assembly of claim 11 wherein the housing comprises a removable bowl and the spring biases the contact surface of the moveable pin against a metal portion of the bowl.

13. A fluid treatment element for treating a fluid, the fluid treatment element comprising:
   a hollow fluid treatment pack having an inner periphery, an outer periphery, first and second axial ends, and a plurality of axially extending pleats, each pleat having a folded portion and first and second pleat legs extending from the folded portion between the inner and outer peripheries, the pleated fluid treatment pack comprising a pleated multilayer composite including a layer of porous fluid treatment medium having an upstream side and a downstream side and a conductive porous metal layer on one of the upstream side and downstream side of the porous fluid treatment medium;
   first and second end caps mounted to the first and second ends, respectively, of the fluid treatment pack to direct fluid through the porous fluid treatment medium from the upstream side to the downstream side, at least one of the first and second end caps having an outer surface which faces away from the fluid treatment pack; and
   a spring-biased electrical contact arrangement mounted to said at least one end cap and including an electrical conductor, a spring, and a moveable electrical contact, wherein the electrical conductor extends within a pleat of the fluid treatment pack along at least one of the first and second pleat legs and is electrically coupled to the porous metal layer, wherein the moveable electrical contact extends beyond the outer surface of said end cap and is moveable toward and away from the outer surface of said end cap, the moveable electrical contact being electrically coupled to the electrical conductor, and wherein the spring biases the electrical contact away from the outer surface of said end cap.

14. The fluid treatment element of claim 13 wherein said at least one end cap is formed from metal.

15. The fluid treatment element of claim 13 wherein the porous fluid treatment medium comprises a glass fiber medium.

16. The fluid treatment element of claim 13 wherein the outer surface of said at least one end cap faces axially and the electrical contact moves axially toward and away from the outer surface.

17. The fluid treatment element of claim 13 wherein the outer surface of said at least one end cap faces radially and the electrical contact moves radially toward and away from the outer surface.

18. The fluid treatment element of claim 13 wherein the conductor of the spring-biased electrical contact arrangement comprises a metal casing which houses the spring and at least a portion of the electrical contact, the metal casing extending from said at least one end cap within the pleat and contacting the porous metal layer of the fluid treatment pack.

19. A fluid treatment assembly comprising a housing and a fluid treatment element of claim 13, wherein the housing has a fluid inlet and a fluid outlet and defines a fluid flow path within the housing between the inlet and the outlet and wherein the fluid treatment element is positioned within the housing across the fluid flow path, the spring of the spring-biased electrical arrangement biasing the electrical contact against a conductive portion of the housing.

20. The fluid treatment assembly of claim 19 wherein the housing comprises a removable bowl and the spring biases the electrical contact against a metal portion of the bowl.

* * * * *